*(12)* United States Patent
Kelly et al.

(10) Patent No.: US 7,512,201 B2
(45) Date of Patent: Mar. 31, 2009

(54) MULTI-CHANNEL SYNCHRONIZATION ARCHITECTURE

(75) Inventors: William R. Kelly, Verbank, NY (US); Victor Moy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 605 days.

(21) Appl. No.: 11/160,218

(22) Filed: Jun. 14, 2005

(65) Prior Publication Data

US 2007/0002845 A1 Jan. 4, 2007

(51) Int. Cl.
*H04L 7/00* (2006.01)
(52) U.S. Cl. ..................... 375/356; 375/354
(58) Field of Classification Search ................. 375/354, 375/355, 371–376
See application file for complete search history.

(56) References Cited

U.S. PATENT DOCUMENTS

| | | | | | |
|---|---|---|---|---|---|
| 5,432,791 | A | * | 7/1995 | Gancarcik | 370/516 |
| 5,432,823 | A | * | 7/1995 | Gasbarro et al. | 375/356 |
| 5,481,574 | A | * | 1/1996 | Evert et al. | 375/356 |
| 5,486,783 | A | * | 1/1996 | Baumert et al. | 327/147 |
| 5,555,548 | A | * | 9/1996 | Iwai et al. | 709/208 |
| 5,712,882 | A | * | 1/1998 | Miller | 375/356 |
| 5,712,883 | A | * | 1/1998 | Miller et al. | 375/371 |
| 5,771,264 | A | * | 6/1998 | Lane | 375/376 |
| 5,805,003 | A | * | 9/1998 | Hsu | 327/270 |
| 5,870,594 | A | * | 2/1999 | Doi et al. | 713/500 |
| 5,898,331 | A | * | 4/1999 | Fujita | 365/189.08 |
| 5,952,857 | A | * | 9/1999 | Suzuki | 327/149 |
| 5,987,083 | A | * | 11/1999 | Matsushita et al. | 375/356 |
| 6,002,282 | A | * | 12/1999 | Alfke | 327/165 |
| 6,028,816 | A | * | 2/2000 | Takemae et al. | 365/233.1 |
| 6,150,866 | A | * | 11/2000 | Eto et al. | 327/297 |
| 6,166,572 | A | * | 12/2000 | Yamaoka | 327/149 |
| 6,178,212 | B1 | * | 1/2001 | Akashi | 375/355 |
| 6,279,090 | B1 | | 8/2001 | Manning | |
| 6,292,521 | B1 | * | 9/2001 | Lai et al. | 375/357 |
| 6,297,702 | B1 | * | 10/2001 | Locker et al. | 331/2 |
| 6,316,980 | B1 | * | 11/2001 | Vogt et al. | 327/273 |
| 6,426,984 | B1 | * | 7/2002 | Perino et al. | 375/356 |
| 6,516,040 | B1 | * | 2/2003 | Lecourtier et al. | 375/356 |
| 6,570,944 | B2 | * | 5/2003 | Best et al. | 375/355 |
| 6,605,969 | B2 | * | 8/2003 | Mikhalev et al. | 327/158 |
| 6,621,882 | B2 | * | 9/2003 | Denny et al. | 375/371 |
| 6,690,201 | B1 | * | 2/2004 | Simkins et al. | 326/93 |
| 6,718,476 | B1 | * | 4/2004 | Shima | 713/400 |
| 6,976,183 | B2 | * | 12/2005 | Gage et al. | 713/500 |
| 7,039,323 | B2 | * | 5/2006 | Jong et al. | 398/155 |
| 7,110,485 | B2 | * | 9/2006 | Bertschmann et al. | 375/375 |
| 7,171,321 | B2 | * | 1/2007 | Best | 702/106 |
| 7,203,225 | B2 | * | 4/2007 | Herb et al. | 375/221 |
| 7,210,052 | B2 | * | 4/2007 | Lee et al. | 713/500 |
| 7,231,536 | B1 | * | 6/2007 | Chong et al. | 713/400 |
| 7,245,553 | B2 | * | 7/2007 | Lin et al. | 365/233.1 |
| 7,251,194 | B2 | * | 7/2007 | Lin et al. | 365/233.5 |
| 7,280,628 | B1 | * | 10/2007 | Gupta et al. | 375/355 |
| 7,340,631 | B2 | * | 3/2008 | Adkisson | 713/400 |

(Continued)

*Primary Examiner*—Chieh M Fan
*Assistant Examiner*—Jason M. Perilla
(74) *Attorney, Agent, or Firm*—H. Daniel Schnurmann (57) ABSTRACT

The present invention provides a robust global timing resynchronization architecture, a multi-link communications system including the same, and a method for minimizing the effects of resynchronization signal skew, reference clock skew, and PLL static phase error variations on resynchronization of multi-link communications systems.

18 Claims, 6 Drawing Sheets

U.S. PATENT DOCUMENTS

| | | |
|---|---|---|
| 7,349,510 B2 * | 3/2008 | Best et al. .................... 375/355 |
| 2001/0020278 A1 * | 9/2001 | Saito .......................... 713/400 |
| 2002/0196883 A1 * | 12/2002 | Best et al. .................... 375/355 |
| 2003/0030872 A1 * | 2/2003 | Jong et al. ................... 359/180 |
| 2003/0043926 A1 * | 3/2003 | Terashima et al. .......... 375/257 |
| 2003/0118142 A1 * | 6/2003 | Xiu et al. .................... 375/376 |
| 2004/0114670 A1 | 6/2004 | Cranford, Jr. et al. |
| 2005/0002475 A1 | 1/2005 | Menolfi et al. ............... 375/355 |
| 2005/0111602 A1 * | 5/2005 | Suda et al. ................... 375/355 |
| 2005/0123086 A1 * | 6/2005 | Yoshimura et al. .......... 375/356 |
| 2006/0050823 A1 * | 3/2006 | Klingler ...................... 375/354 |
| 2006/0120496 A1 * | 6/2006 | Okamura ..................... 375/355 |
| 2006/0153325 A1 * | 7/2006 | Uchida ........................ 375/356 |
| 2006/0245523 A1 * | 11/2006 | Pessa .......................... 375/328 |

* cited by examiner

MULTI-CHANNEL SYNCHRONIZATION ARCHITECTURE

BACKGROUND OF THE INVENTION

1. Field of the Invention

The present invention broadly relates to high speed serial link communications systems, and more particularly, to an architecture, system, and method of re-synchronizing multiple serial link channels.

2. Description of the Prior Art

The need for high bit-rate Inputs/Outputs (I/Os) becomes increasingly necessary for inter-chip, chip-to-chip, chip-to-system, board-to-board, and chassis-to-chassis signaling interfaces as the demand for off-chip signal bandwidth grows. Packaging technology limitations confine both the width of off-chip parallel busses and the number of external I/O pins. High-speed serial link communication is an alternate signaling approach to wide parallel data busses and increased I/Os. High-speed serial links are used for chip-to-chip, board-to-board and chassis-to-chassis connections. In chip-to-chip connections, both chips reside on the same board, and the distance between the two is usually less than 10 inches. In this case all high-speed input/output (I/O) cells are integrated inside the chip, which puts new requirements, such as low power and small die size, on the I/O cells.

High-speed serial link communication techniques multiplex and de-multiplex data onto and off of high-speed serial communication channels, thus reducing hundreds of parallel connections to a few serial connections. Industry-wide adoption of high-speed serial communication schemes has been prevalent. For example, on Jul. 23, 2002 the Peripheral Component Interconnect Special Interest Group (PCI-SIG) approved the PCI Express™ Specification for High-Performance Serial I/O. Unlike PCI and PCI-XTM, which are based on 32-bit and 64-bit parallel buses, respectively, the PCI Express™ specification uses high-speed serial link technology similar to that found in Gigabit Ethernet, Serial ATA (SATA), and Serial-Attached SCSI (SAS). PCI Express™ reflects an industry trend to replace legacy shared parallel buses with high-speed point-to-point serial links.

Figure 1:
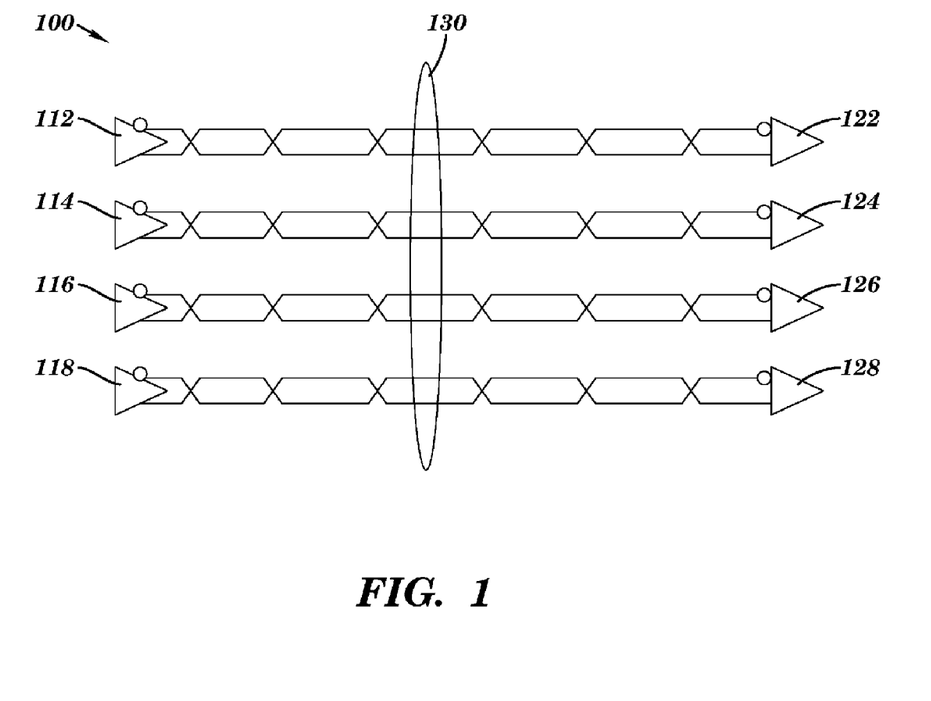
FIG. 1 is a pictorial representation illustrating a conventional multi-link communication system.

Conventional high speed serial link communication systems typically comprise one or more serial link transmitters, one or more serial link receivers, and a communication channel linking each transmitter/receiver pairing. For example, FIG. 1 illustrates a conventional high speed serial link communications system comprising four serial transmitters 112-118, four serial receivers 122-128 and communication links/channels 130 for coupling the transmitters to the receivers.

High-speed serial link transmitters serialize parallel data received from a chip and drive the serialized data onto a serial link. High-speed serial link receivers receive the transmitted signals from the serial link, recover an encoded clock signal and the serialized data from the received signals, and de-serialize the data. As such, a receiver must perform some form of equalization, clock recovery, data recovery, and de-serialization. The communication channels carry the serial data from the transmitters to the receivers.

Both high-speed serial link transmitters and receivers include circuit for controlling the timing of internal operations. Conventionally, such transmitters and receivers incorporate clock domains for distributing timing signals. Clock domains are known in the art to refer to a plurality of circuits, such as latches, flip/flops, and the like, which are controlled by the same or similar clock signals, having identical frequency and enable/disable control, and similar phase alignment (sufficient for setup and/or hold time interaction within the domain). Each clock domain includes one or more clock trees, Phase-Locked-Loop (PLL) circuits, clock repeaters, and the like.

Clock domains are typically extended simply by driving a clock signal from each of the aforementioned links to a physically centralized point, where each of the clocks operate separate latches which capture the central "sampling latch" output. In effect, this physically extends the internal clock domain of each link to the centralized point.

Timing circuit contained in high-speed serial link transmitters and receivers also provides global timing synchronization for communications systems incorporating multiple high-speed serial links grouped together to form a parallel communication channel. Global timing control and synchronization is critical for multi-link communication systems in order to maintain data integrity (e.g., all system data is transmitted and received at an expected point in time, not one or more clock cycles early or late). For example, FIG. 1 illustrates a multi-link communications system 100 including four serial links grouped together to form a communications bus 130. Transmitters 112-118 transmit serial data streams onto the communication bus 130 and receivers 122-128 receive the transmitted data as previously described. Each transmitter and receiver can reside on a separate chip or can be grouped together as one or more cores. For example, transmitters 112-118 can each reside on a separate chip or can be grouped together as a core, that core residing in a single chip.

In a multi-link communications system such as system 100, parallel streams of serialized data transmitted over bus 130 have a specific timing relationship that must be maintained during transmission and reception in order to preserve data integrity. Thus, each communication channel must maintain a particular timing relationship to the other channels, otherwise data integrity may be compromised. As such, timing is critical not only for the internal operations of a particular serial link connection (transmitter, channel, and receiver timings), but timing is also critical for global synchronization between all channels in a multi-link communications system. Without global timing synchronization, system data integrity will be compromised.

PLLs are commonly one component utilized in multi-link communication systems for maintaining timing synchronization. PLLs synchronize the phase and frequency of a Voltage Controlled Oscillator (VCO) to an input reference clock. There are a number of components that comprise a PLL to achieve this phase alignment. A PLL compares the rising edge of a reference input clock to a feedback clock using a phase-frequency detector (PD). The PD produces an up or down signal that determines whether the VCO needs to operate at a higher or lower frequency. The PD output is applied to a charge pump and loop filter, which produces a control voltage for setting the frequency of the VCO. If the PD transitions to an up signal, then the VCO frequency will increase. If the PD transitions to a down signal, then the VCO frequency will decrease.

The loop filter converts these high and low signals to a voltage that is used to bias the VCO. If the charge pump receives a logic high on the up signal, current is driven into the loop filter. If the charge pump receives a logic high on the down signal, current is drawn from the loop filter. The loop filter filters out glitches from the charge pump and prevents voltage over-shoot, which minimizes VCO jitter. The voltage from the charge pump determines how fast the VCO operates. Divider and/or multiplier circuits can be inserted in the feedback loop to make the VCO frequency some multiple of the input reference frequency, making the VCO frequency output $f_{VCO} = (m \times f_{REF})/n$, where m is the divide ratio, n is the multiply ratio and $f_{REF}$ is the input reference frequency. Therefore, the feedback clock, which is applied to one input of the PD, is locked to the input reference clock, which is applied to the other input of the PD.

When phase relationship between clock signals is a factor, PLL resynchronization may be required. For example, PLL resynchronization is routinely required to resynchronize the various timing circuits contained within a multilink communication system in order to maintain data integrity. The timing circuit contained within a multilink communication system may require resynchronization for a number of reasons, for example, noise, jitter, loss of PLL lock, link-to-link skew, clock skew, PLL phase error, etc.

PLL resynchronization resets a PLL and resynchronizes the PLL with an input reference clock. Typically, PLL resynchronization involves the assertion of an asynchronous resynchronization signal which causes the PLL to reset and resynchronize. For example, when the resynchronization signal is driven high, the PLL will reset its counters, clear its outputs, and lose lock. Once the resynchronization signal is driven low, the PLL lock process begins and the PLL will re-synchronize to the input reference clock. After the PLL re-locks, all output clocks will have the correct phase relationship.

Figure 2:
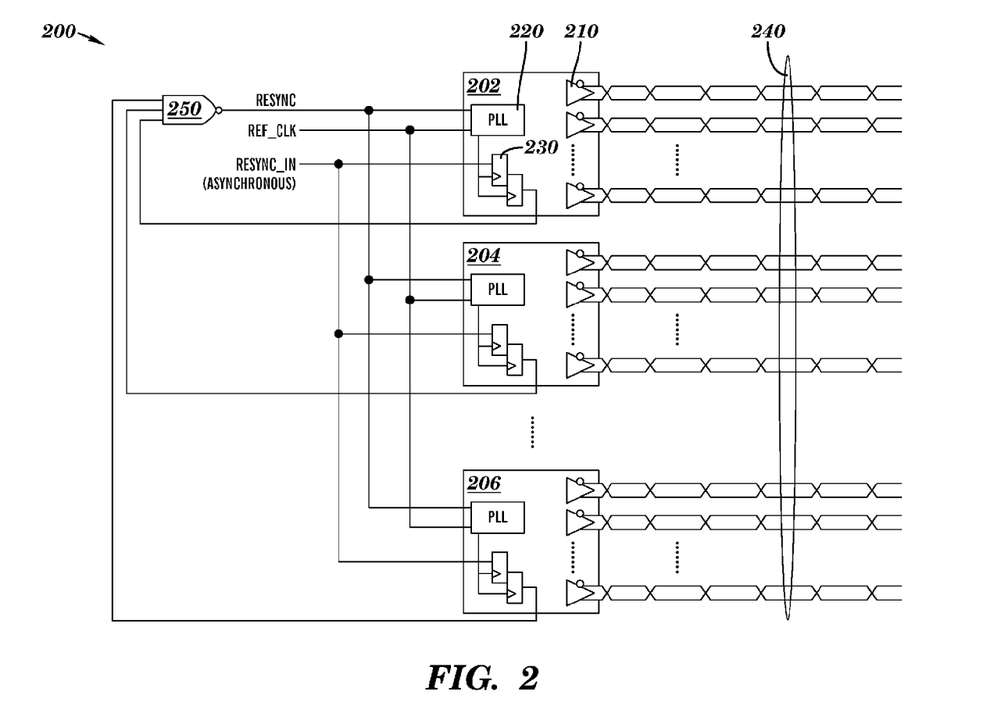
FIG. 2 is a pictorial representation illustrating a conventional multi-link communications system including a global asynchronous resynchronization signal.

FIG. 2 illustrates a conventional multi-link communications system 200 that includes a global asynchronous resynchronization signal (RESYNC_IN) and centralized resynchronization sampling point for distributing the sampled resynchronization signal to the various transmitter circuits within the communications system. Communications system 200 comprises a plurality of high-speed serial link transmitters such as transmitter 210. More than one transmitter can be grouped together in a core as previously described. For example, cores 202, 204 and 206 can comprise one or more high-speed serial transmitters. Additionally, each core includes timing circuitry adapted to control the internal operations of a particular core (e.g. transmitter timings) and for global synchronization between all channels in a multilink communications system. For example, cores 202, 204 and 206 each contain a PLL such as PLL 220 for timing purposes. Communications system 200 includes a plurality of communication channels 240 for conveying serial data streams from a transmit side of the communications system to a receive side.

As described previously, the timing circuit of each core may require resynchronization for a variety of reasons. Some applications require multi-link configurations which group several links and cores into a bus, and impose limitations on the skew between these links. Due to the size and complexity of high-speed serial link designs (e.g., cores), such skew limitations can be very challenging when more than two or three cores are grouped together to form a multi-link communications system. Even with perfectly matched internal core timings, the uncertainty introduced when resynchronizing all core timing circuit can result in unacceptable skew.

Conventional multi-link communication systems such as system 200 include a global asynchronous resynchronization signal (RESYNC_IN) which is applied to the timing circuit of each core and serves to resynchronize each core. The RESYNC_IN signal is received, or captured, by each core. Double latches, such as double latch 230, are conventionally used to latch the RESYNC_IN signal because double latches provide metastability hardening. That is, double latch designs prevent unstable states caused by timing violations commonly associated with asynchronous signals (e.g. setup and/or hold time violations). Metastability manifests itself in a number of ways such as causing a latch to switch states, causing a latch not to switch states, causing a runt pulse, or causing oscillations at the output of a latch. The output of each double latch is transmitted to an n-input NAND gate 250 where n equals the number of double latches. The output of NAND gate 250 is the resynchronization signal (RESYNC) received by the timing circuitry in each core. RESYNC is used by each core to perform the timing resynchronization process previously described.

Multi-link communications systems such as the kind illustrated in FIG. 2 impose link-to-link skew limitations requiring precise control of the RESYNC signal assertion timing to each link, such that all links respond on the same reference clock cycle. If all links do not respond to the RESYNC signal on the same reference clock cycle, data integrity will be comprised. RESYNC signal skew, reference clock skew, and PLL static phase error variations introduced by multiple serial link cores may cause one or more of the links not to respond to the RESYNC signal on the same reference clock cycle. PLL static phase error is the time difference between the averaged input reference clock and the averaged feedback input signal when the PLL is in locked mode.

Known solutions to RESYNC signal skew, reference clock skew, and PLL static phase error variations are constrained by timing limitations resulting from the physical size and placement of the serial link cores involved, rendering them useful only in very minimal configurations. For example, as illustrated in FIG. 2, the conventional system 200 suffers from three timing constrained paths. First, NAND gate 250 provides the RESYNC signal to the cores only when the last (i.e. slowest) of the sampled resynchronization signals is received from all the double latches. Thus, the global resynchronization architecture is very sensitive to skew and core placement and must be precisely addressed during the design process, the solution of which is both layout and design-dependent. Second, skew associated with the RESYNC signal as it propagates from NAND gate 250 to the various cores creates further timing constraints and must also be precisely addressed during the design process, the solution of which is also layout and design-dependent. Third, as described previously, the core-to-core PLL static phase error difference.

Therefore, there exists a need in the art for a robust global timing resynchronization architecture and multi-link communications systems including the same that minimize the effects of resynchronization signal skew, reference clock skew, and PLL static phase error variations on resynchronization of multi-link communication systems.

BRIEF SUMMARY OF THE INVENTION

The present invention provides a robust global timing resynchronization architecture, multi-link communications systems including the same, and a method that minimize the effects of resynchronization signal skew, reference clock skew, and PLL static phase error variations on resynchronization of multi-link communication systems.

In accordance with one aspect of the invention, an apparatus comprises a sampling circuit operable to detect a resynchronization signal and to generate a sampled version of the resynchronization signal, and a plurality of synchronous staged pipelines coupled to the sampling circuit, operable to provide the sampled resynchronization signal to a plurality of serial link circuits.

Furthermore, one of the synchronous staged pipelines is operable to extend a clock domain of one of the serial link circuits to the sampling circuit.

In accordance with another aspect of the invention, a high-speed serial link communications system comprises a plurality of serial link cores, a sampling circuit operable to detect a resynchronization signal and to generate a sampled version of the resynchronization signal, and a plurality of synchronous staged pipelines coupled between the sampling circuit and the serial link cores, operable to provide the sampled resynchronization signal from the sampling circuit to the serial link cores.

In accordance with yet another aspect of the invention, a method of re-synchronizing a serial link communications system comprises detecting a resynchronization signal by a sampling circuit, generating a sampled version of the resynchronization signal, providing the sampled version of the resynchronization signal to a plurality of serial link cores by a plurality of synchronous staged pipelines, and extending a clock domain of one of the serial link cores to the sampling circuit by one of the synchronous staged pipelines.

Further and still other aspects of the present invention will become more readily apparent when the following detailed description is taken in conjunction with the accompanying drawing figures.

DETAILED DESCRIPTION OF PREFERRED EMBODIMENTS OF THE INVENTION

The present invention provides a robust global timing resynchronization architecture, multi-link communications system including the same, and a method for minimizing the effects of resynchronization signal skew, reference clock skew, and PLL static phase error variations on resynchronization of multi-link communications systems.

An embodiment of the present invention provides a resynchronization scheme which enables an asynchronous resynchronization input signal to be sampled reliably by correlated clock pulses within the clock domains of each serial link contained within the multi-link communications system. An embodiment of the multi-link communications system of the present invention includes serial link cores where each core contains a plurality of serial links (e.g., serial link transmitters or serial link receivers). Alternatively, each serial link included in the multi-link communications system can be provided as a separate Integrated Circuit (IC). Portions of the robust global timing resynchronization architecture of the present invention can be implemented on an IC, i.e., a chip, partly on a chip and on a component with which the chip is packaged, or partly on a chip and on an element of a larger assembly such as a component of a circuit board or a component mounted to a circuit board.

For ease of explanation only, the robust global timing resynchronization architecture of the present invention and the multi-link communications system including the same is next described in accordance with high-speed serial link cores where each core can include a plurality of serial links. Those skilled in the art will recognize that the robust global timing resynchronization architecture of the present invention can be incorporated in multi-link communications systems comprising high-speed serial link cores or individual serial links grouped together to form multiple serial link communications channels.

One function of the robust global timing resynchronization architecture of the present invention is to centralize the detection of an asynchronous resynchronization assertion to a minimal area, providing greater timing margin to handle the grouping of several high-speed serial link cores. The robust global timing resynchronization architecture comprises two components. The first component is a central sampling circuit for detecting the assertion of a global asynchronous resynchronization signal and for providing a sampled version of the asynchronous resynchronization signal to each high-speed serial link core contained in a multi-link communications system. The second component are synchronous staged pipelines for extending at least one core clock domain to the central sampling circuit and for providing the sampled resynchronization signal from the central sampling circuit to each high-speed serial link core.

Figure 3:
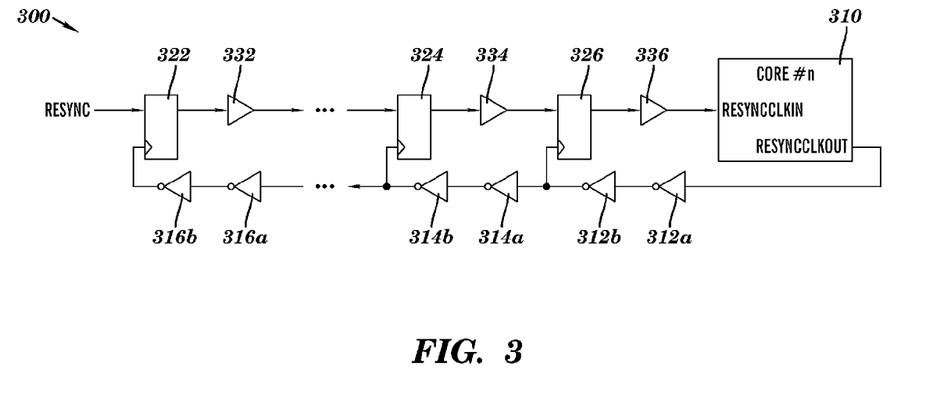
FIG. 3 is a pictorial representation illustrating an embodiment of a synchronous staged pipeline of the present invention.

FIG. 3 illustrates an embodiment of a synchronous staged pipeline 300 for extending at least one core clock domain to a central sampling circuit (not shown) and for providing a sampled resynchronization signal (RESYNC) from the central sampling circuit to each high-speed serial link core, for example, core 310. Within each high-speed serial link core included in a multi-link communications system, a synchronized clock gating function is implemented which gates the internal clock domains of each core according to a defined sequence. This sequence is synchronously tied to a resynchronization input signal (RESYNCCLKIN) as sampled by a core resynchronization clock (RESYNCCLKOUT) such that all links within a particular core emerge from reset on the same internal clock cycle, thus eliminating all systematic core link-to-link skew.

When multiple cores are grouped together to form a multi-link communications system (e.g. four cores, where each core contains four high-speed serial links to form sixteen high-speed serial link channels), the challenge is to ensure that each core samples the RESYNCCLKIN signal with the properly correlated RESYNCCLKOUT clock pulse. Such sampling coordination is hampered by the fact that the internal functional "at-speed" clock of each core is too fast for timing interaction with logic outside the core. Instead, a slower feedback clock signal from the internal PLL (FBCLK) is used as RESYNCCLKOUT. FBCLK is the output of a core PLL divided by the reference multiplier, and is phase aligned to the input reference clock to within the static phase error of the PLL as previously described. PLL static phase error, combined with the reference clock tree skew, contribute directly to high-speed serial link core-to-core link skew as previously described and should be minimized. For illustrative purposes only, the skew budget for PLL static phase error and reference clock tree skew can be 100 picoseconds (ps) each, for a total of 200 ps. Using this budget, and a minimum FBCLK period of 1.25 ns (800 MHz), a budget of 1.05 ns remains to support timing of the external multi-link communications system resynchronization circuitry.

The synchronous staged pipeline 300 of FIG. 3 includes at least one stage, where each stage comprises a latch, a buffer coupled to the output of the latch, and two inverters electrically coupled in series that provide a clock input signal to the latch. For example, synchronous staged pipeline 300 comprises a plurality of stages such as the stage formed by latch 322, buffer 332, and inverters 316a and 316b. The clock domain of core 310 can be extended to a central sampling circuit (not shown) by the inverters of each stage such as inverters 312a-312b, 314a-314b, and 316a-316b. The inverters of each stage can provide the resynchronization clock signal of a particular core (RESYNCCLKOUT) to the central sampling circuit. The RESYNCCLKOUT signal can be a feedback clock from a PLL within a particular core were the frequency of RESYNCCLKOUT is equal to the input PLL reference clock divided by a multiple n. The clock signal received at the central sampling circuit is a delayed version of RESYNCCLKOUT where the delay corresponds to the number of pipeline stages (i.e., the number of inverters). Additionally, synchronous staged pipeline 300 provides the sampled resynchronization signal (RESYNC) from the central sampling circuit to each core. RESYNC is received by core 310 through synchronous staged pipeline 300 via the latches of each stage such as latches 322-326. The output of each latch is buffered by one or more buffers such as buffers 332-336.

Each core residing in the multi-link communications system of the present invention is coupled to a central sampling circuit via a synchronous staged pipeline such as pipeline 300. Each pipeline is capable of extending at least one core clock domain to the central sampling circuit and providing the sampled resynchronization signal from the central sampling circuit to each core as previously described and also in accordance with FIG. 3.

For multi-link communications systems comprising more than one core, each synchronous staged pipeline must contain the same number of stages (e.g. latches), and should be clocked by the rising edge of their respective resynchronization clock signal (e.g. RESYNCCLKOUT). The relative core-to-core resynchronization clock tree skew should be minimized, as this skew directly reduces timing margin at the central sampling circuit.

Figure 4:
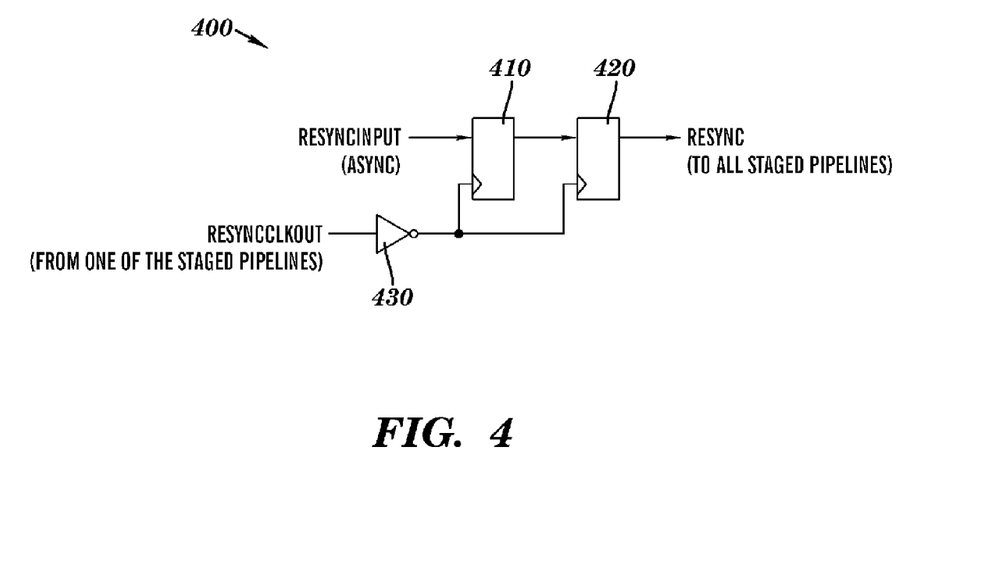
FIG. 4 is a pictorial representation illustrating an embodiment of a central sampling circuit of the present invention.

FIG. 4 illustrates an embodiment of a central sampling circuit 400 for detecting the assertion of a global asynchronous resynchronization signal (RESYNCINPUT) and for providing a sampled version of the asynchronous resynchronization signal (RESYNC) to each high-speed serial link core contained in a multi-link communications system (not shown) via a synchronous staged pipeline such as the kind previously described. Preferably, RESYNCINPUT is sampled by a double-latch for metastability hardening. For example, latches 410 and 420 can form a double-latch for sampling RESYNCINPUT free from metastability concerns. The Double-latch is preferably clocked by the falling edge of a clock signal from one of the synchronous staged pipelines (RESYNCCLKOUT). Inverter 430 causes double-latch to be clocked by the falling edge of RESYNCCLKOUT. The falling edge of RESYNCCLKOUT is used to avoid hold time violations when forwarding the RESYNC signal to the synchronous staged pipelines. Alternatively, use of the rising edge of RESYNCCLKOUT along with delay elements is also possible, but is typically more difficult to time over various process, voltage, and temperature conditions. Preferably, because the RESYNCINPUT signal is asynchronous, it is asserted for a minimum of two system reference clock cycles so that it can be reliably sampled by the central sampling circuit.

For multi-link communications systems where many cores are grouped together, the loading on the double-latch contained in the central sampling circuit can be high, thus negatively impacting timing. For such systems, multiple latches can be coupled to the second latch of the double-latch. The multiple latches coupled to the second latch are clocked by the same clock as the double-latch. The multiple latches "fan out" the sampled version of the asynchronous resynchronization signal, thus improving timing by reducing the loading on any given latch.

Figure 5:
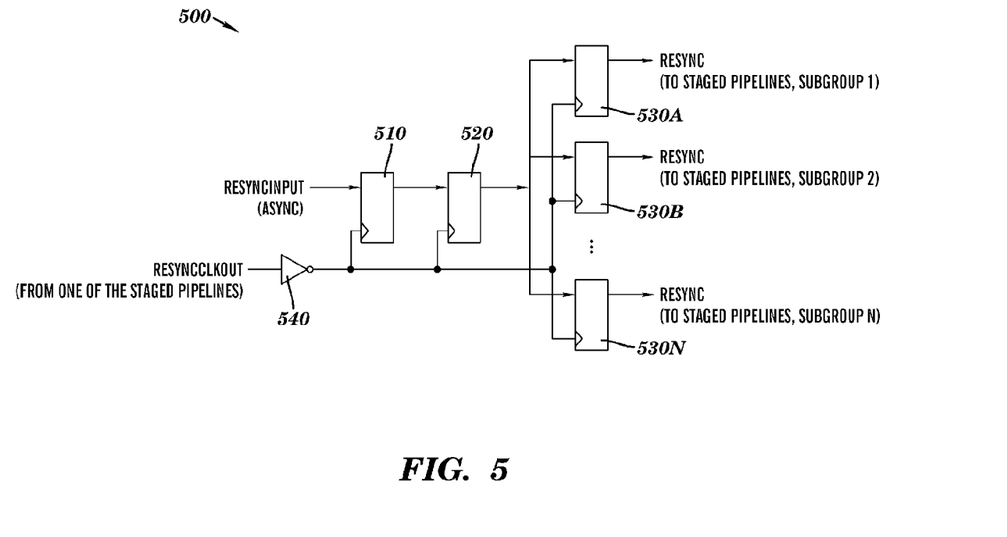
FIG. 5 is a pictorial representation illustrating another embodiment of a central sampling circuit of the present invention.

FIG. 5 illustrates an embodiment of a central sampling circuit 500 which includes one or more latches coupled to the second latch of a double-latch for "fanning out" the sampled version of the asynchronous resynchronization signal (RESYNC). For example, the double-latch is formed by first latch 510 and second latch 520. A plurality of latches can be coupled to the output of second latch 520 to "fan out" the RESYNC signal to multiple cores. For a multi-link communications system comprising n high-speed serial link cores, n latches such as latches 530A-530N can be coupled to the output of second latch 520. A synchronous staged pipeline (not shown) couples the output of each latch 530A-530N to each of the n cores for extending at least one core clock domain to the central sampling circuit 500 and for providing the RESYNC signal from the central sampling circuit to each core as previously described and in accordance with FIG. 3.

The double-latch formed by first latch 510 and second latch 520 is preferably clocked by the falling edge of the clock signal from one of the synchronous staged pipelines (RESYNCCLKOUT). Inverter 540 causes the double-latch to be clocked by the falling edge of RESYNCCLKOUT. The falling edge of RESYNCCLKOUT is used to avoid hold time violations as previously described. Alternatively, use of the rising edge of RESYNCCLKOUT along with delay elements is also possible.

Once the RESYNC signal is successfully transferred into each synchronous staged pipeline, timing is more straightforward. Transfers along each synchronous staged pipeline are essentially register-to-register, although a delay element will be required to compensate for the intentional clock skew and to eliminate hold time issues. Since a full clock cycle time is available here, this is less challenging.

For multi-link communications systems where "dynamic" group membership is required, that is, where timing resynchronization is not required, gating logic can be easily inserted between latches of the pipeline to block the RESYNC signal from reaching the core. This will not impact the timing at the central sampling circuit.

To effectively implement the robust global timing resynchronization architecture of the present invention into multi-link communications systems, several timing issues must be addressed. For example, the robust global timing resynchronization architecture must: support the minimum system reference clock (REFCLK) period (e.g., 1250 ps (800 MHz)); tolerate skew in the clock tree feeding REFCLK to the cores in a group (e.g., budget 100 ps core-to-core skew); tolerate high-speed serial link PLL static phase error variation which is the core-to-core variation in the skew between the REFCLK input and the RESYNCCLKOUT output when the PLL is locked (e.g., budget 100 ps core-to-core variation); tolerate skew in the clock tree used for the RESYNCCLKOUT signal in the staged pipelines as previously described (e.g., budget 100 ps core-to-core skew at the central sampling point); and tolerate duty cycle of the RESYNCCLKOUT signal when using both rising and falling edges (e.g., at 45% to 55% duty cycle, budget 63 ps pulse shrinkage from edge to edge, leaving a pulse width of 562 ps at 800 MHz).

Based on such considerations, the timing budget at the central sampling circuit for transfer from the selected RESYNCCLKOUT sampling clock domain to each of the remaining pipeline domains is: 1250 ps period*(1-0.55)=562 ps (penalty @ 55% duty cycle) minus: 100 ps REFCLK skew; 100 ps PLL static phase error variation; and 100 ps RESYNCCLKOUT skew which equal 262 ps (clock-to-output of "hardened" double-latch, plus setup time of pipeline input latch). Since this is insufficient for most "slow-chip" cases, and use of the falling edge of the clock solves the hold time issue with 262 ps of excess margin, it is necessary to "slack steal" by taking the negative clock edge from earlier in the clock tree. With reasonable effort, more than 150 ps of the excess hold slack can be shifted to the setup side, bringing the budget to over 412 ps in "slow chip" mode. Since this intentional skew will be reduced at "fast-chip" conditions, the use of the falling clock edge ensures against hold time issues. Setup issues are also improved in fast-chip mode due to improved clock-to-output delays.

Figure 6:
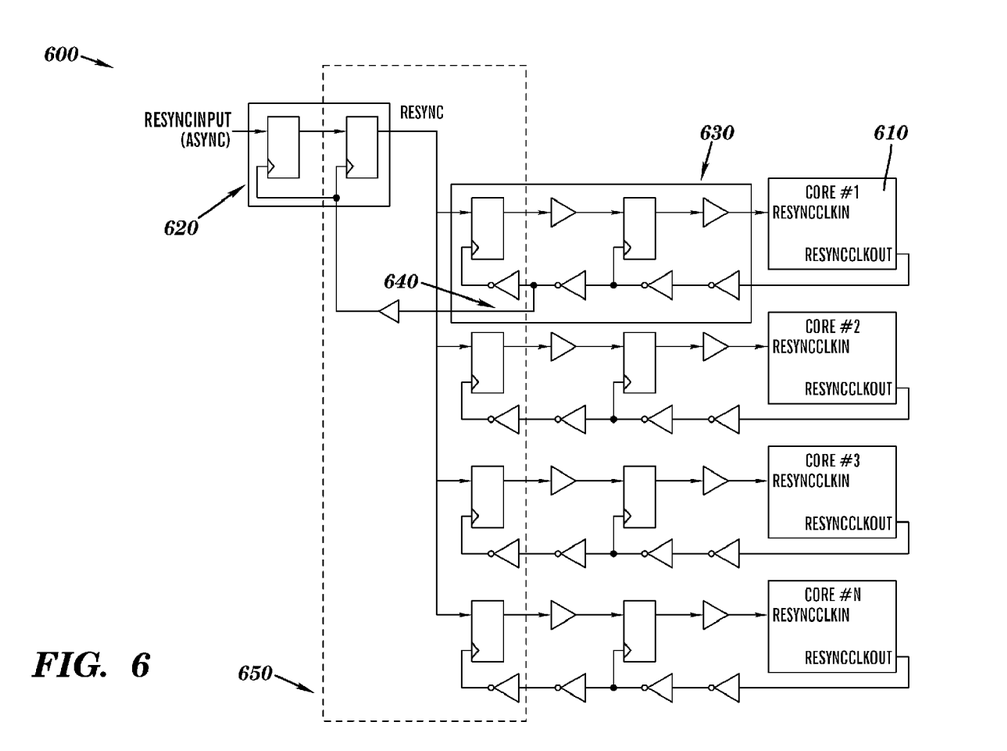
FIG. 6 is a pictorial representation illustrating an embodiment of a multi-link communications system of the present invention.

FIG. 6 illustrates an embodiment of a multi-link communications system 600 comprising the robust global timing resynchronization architecture of the present invention and a plurality of high-speed serial link cores such as core 610. The global timing resynchronization architecture includes a plurality of synchronous staged pipelines that couple each of the cores to central sampling circuit 620. For example, synchronous staged pipeline 630 couples core 610 to central sampling circuit 620. This embodiment of the robust global timing resynchronization architecture of the present invention implements "slack stealing" by taking the negative clock edge from earlier in one of the synchronous staged pipeline clock trees. For example, the connection at node 640 enables "slack stealing" by taking the negative clock edge from earlier in the synchronous staged pipeline 630. Preferably, the components located within region 650 are positioned as close to each other as physically possible to minimize pipeline-to-pipeline clock tree skew.

Multi-link communications systems comprising the robust global timing resynchronization architecture of the present invention can comprise a plurality of serial link transmitters, a plurality of serial link receivers, and a communication channel coupling each transmitter/receiver pairing. Each transmitter transmits, or drives, serial streams of information onto a communication channel and each receiver receives one of the serial streams of data from one of the communication channels. The communication channels carry the serial data from the transmitters to the receivers. Multiple serial link transmitters and/or receivers can be incorporated into a core or can be implemented as separate ICs. Groups of cores and/or ICs can be grouped to form a multi-link communications system and can comprise one or more serial link transmitters and/or receivers.

For example, commonly-owned, co-pending U.S. patent application Ser. No. 10/711,713 filed on Sep. 30, 2004 (the '713 Patent Application), the entirety of which is hereby incorporated by reference herein, illustrates a high-speed serial link receiver. The receiver has a Front End Interface (FEI) unit at the input end of the receiver, the FEI providing line terminations for the transmitted serial differential signals. The receiver also includes a built-in-self-test (BIST) unit, which verifies operation upon initializing the receiver by inputting a known test data pattern into the receiver and then verifying the outcome.

The receiver also includes amplify and hold circuit for receiving the transmitted data signals and a decision feedback equalizer (DFE) unit for deserializing the received data and as an adaptive equalizer. The DFE outputs n bits of data in parallel to logic circuit. The DFE makes a decision as to the value of the present bit in a serial stream of bits that appears at the receiving end of the channel. The DFE operates by weighting the voltage of the present bit with the values of the bits that come before the present bit and the bits that come after the present bit. As an adaptive equalizer, the coefficients used to weight the values of the bits are updated during operation of the DFE in response to changes that occur in the channel, as well as changes that occur in the degree of inter-symbol interference. The receiver may be operated in conjunction with a transmitter having a feed forward equalizer (FFE), in which the tap coefficients cannot be adjusted by feedback based on the results of receiving operation by the DFE. Alternatively, the receiver can transmit information for updating FFE coefficients of the transmitter from the receiver back to the transmitter using an up-channel communication technique. For example, a particular embodiment of a circuit permitting communication of information from a high-speed serial link receiver in an up-channel direction back to a transmitter is described in commonly assigned U.S. Patent Application Publication No. 2004/0114670 published on Jun. 17, 2004 (the '670 Patent Application Publication), the entirety of which is hereby incorporated herein by reference. In addition, a system for generating information at a receiver for updating coefficients of an FFE and for transmitting that information back to the transmitter is described in commonly assigned U.S. patent application Ser. No. 10/710,064 filed Jun. 16, 2004 (the '064 Patent Application), the entirety of which is hereby incorporated herein by reference.

High-speed serial link transmitters include circuitry for transmitting serial streams of data and an optional encoded clock signal over a serial link. For example, commonly-owned, co-pending United States Patent Application Publication No. 2005/0002475 published on Jan. 6, 2005 (the '475 Patent Application Publication), the entirety of which is hereby incorporated by reference herein, illustrates a high-speed serial transmitter.

While the invention has been described in terms of specific embodiments, it is evident in view of the foregoing description that numerous alternatives, modifications and variations will be apparent to those skilled in the art. Accordingly, the invention is intended to encompass all such alternatives, modifications and variations which fall within the scope and spirit of the invention and the following claims.

What is claimed is:

1. An apparatus comprising:
 a sampling circuit operable to detect a resynchronization signal and to generate a sampled version of the resynchronization signal; and
 a plurality of synchronous staged pipelines coupled to the sampling circuit, operable to provide the sampled resynchronization signal to a plurality of serial link circuits, the synchronous staged pipelines each comprising:
 at least one latch operable to capture the sampled resynchronization signal;
 at least one buffer coupled to the output of the latch; and
 inverters coupled to a clock input of the latch.

2. The apparatus of claim 1, wherein one of the synchronous staged pipelines is operable to extend a clock domain of one of the serial link circuits to the sampling circuit.

3. The apparatus of claim 1, wherein the serial link circuits are included in at least one core.

4. The apparatus of claim 1, wherein the serial link circuits comprise a serial link transmitter or a serial link receiver.

5. The apparatus of claim 1, wherein the inverters are operable to provide a clock signal to the latch.

6. The apparatus of claim 5, wherein the clock signal is a Phase Locked Loop (PLL) feedback clock signal.

7. The apparatus of claim 6, wherein a frequency of the PLL feedback clock signal is a multiple of a system reference clock.

8. The apparatus of claim 1, wherein the sampling circuit comprises a double latch operable to detect the resynchronization signal and to generate the sampled version of the resynchronization signal.

9. The apparatus of claim 8, wherein an output of the double latch is coupled to the synchronous staged pipelines.

10. The apparatus of claim 8, further comprising a plurality of latches coupling an output of the double latch to the synchronous staged pipelines.

11. A high-speed serial link communications system comprising:
   a plurality of serial link cores;
   a sampling circuit operable to detect a resynchronization signal and to generate a sampled version of the resynchronization signal; and
   a plurality of synchronous staged pipelines coupling the sampling circuit to the serial link cores, operable to provide the sampled resynchronization signal from the sampling circuit to the serial link cores,
   wherein the synchronous staged pipelines each comprise:
   at least one latch operable to capture the sampled resynchronization signal;
   at least one buffer coupled to the output of the latch; and
   inverters coupled to a clock input of the latch.

12. The communications system of claim 11, wherein one of the synchronous staged pipelines is operable to extend a clock domain of one of the serial link cores to the sampling circuit.

13. The communications system of claim 11, wherein the serial link cores each comprise a plurality of serial link transmitters or serial link receivers.

14. The communications system of claim 11, wherein the sampling circuit comprises a double latch operable to detect the resynchronization signal and to generate the sampled version of the resynchronization signal.

15. The communications system of claim 14, wherein an output of the double latch is coupled to the synchronous staged pipelines.

16. The communications system of claim 14, further comprising a plurality of latches coupling an output of the double latch to the synchronous staged pipelines.

17. A method of re-synchronizing a serial link communications system comprising:
   detecting a resynchronization signal by a sampling circuit;
   generating a sampled version of the resynchronization signal;
   providing the sampled version of the resynchronization signal to a plurality of serial link cores by a plurality of synchronous staged pipelines; and
   extending a clock domain of one of the serial link cores to the sampling circuit by one of the synchronous staged pipelines,
   the synchronous staged pipelines each comprising:
   at least one latch operable to capture the sampled resynchronization signal;
   at least one buffer coupled to the output of the latch; and
   inverters coupled to a clock input of the latch.

18. The method of claim 17, wherein the sampling circuit is operable to being clocked by a clock signal having a frequency multiple of a system reference clock.

* * * * *